United States Patent
Kessler et al.

(10) Patent No.: US 7,024,533 B2
(45) Date of Patent: Apr. 4, 2006

(54) MECHANISM FOR SYNCHRONIZING MULTIPLE SKEWED SOURCE-SYNCHRONOUS DATA CHANNELS WITH AUTOMATIC INITIALIZATION FEATURE

(75) Inventors: Richard E. Kessler, Shrewsbury, MA (US); Peter J. Bannon, Concord, MA (US); Maurice B. Steinman, Marlborough, MA (US); Scott E. Breach, Sunnyvale, CA (US); Allen J. Baum, Palo Alto, CA (US); Gregg A. Bouchard, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 10/441,451

(22) Filed: May 20, 2003

(65) Prior Publication Data

US 2003/0204697 A1 Oct. 30, 2003

Related U.S. Application Data

(62) Division of application No. 09/652,480, filed on Aug. 13, 2000, now Pat. No. 6,636,955.

(51) Int. Cl.
*G06F 12/00* (2006.01)

(52) U.S. Cl. ....................... 711/167; 711/166
(58) Field of Classification Search ............... 711/5, 711/154, 166, 167, 219; 710/25, 52, 310
See application file for complete search history.

(56) References Cited

U.S. PATENT DOCUMENTS 4,864,543 A * 9/1989 Ward et al. ............... 365/221
5,261,066 A 11/1993 Jouppi et al. ............. 395/425

(Continued)

OTHER PUBLICATIONS

*Alpha Architecture Reference Manual*, Third Edition, The Alpha Architecture Committee, 1998 Digital Equipment Corporation (21 p.), in particular pp. 3–1 through 3–15.
*A Logic Design Structure For LSI Testability*, E. B. Eichelberger et al., 1977 IEEE (pp. 462–468).
*Direct RDRAM™ 356/288–Mbit (512Kx16/18x32s)*, Preliminary Information Document DL0060 Version 1.01 (69 p.).

(Continued)

*Primary Examiner*—Matthew Kim
*Assistant Examiner*—Woo H. Choi (57) ABSTRACT

A computer system has a memory controller that includes read buffers coupled to a plurality of memory channels. The memory controller advantageously eliminates the interchannel skew caused by memory modules being located at different distances from the memory controller. The memory controller preferably includes a channel interface and synchronization logic circuit for each memory channel. This circuit includes read and write buffers and load and unload pointers for the read buffer. Unload pointer logic generates the unload pointer and load pointer logic generates the load pointer. The pointers preferably are free-running pointers that increment in accordance with two different clock signals. The load pointer increments in accordance with a clock generated by the memory controller but that has been routed out to and back from the memory modules. The unload pointer increments in accordance with a clock generated by the computer system itself Because the trace length of each memory channel may differ, the time that it takes for a memory module to provide read data back to the memory controller may differ for each channel. The "skew" is defined as the difference in time between when the data arrives on the earliest channel and when data arrives on the latest channel. During system initialization, the pointers are synchronized. After initialization, the pointers are used to load and unload the read buffers in such a way that the effects of inner-channel skew is eliminated.

12 Claims, 4 Drawing Sheets

U.S. PATENT DOCUMENTS

| | | | |
|---|---|---|---|
| 5,317,718 A | | 5/1994 | Jouppi ........................ 395/425 |
| 5,634,043 A | * | 5/1997 | Self et al. .................... 713/503 |
| 5,745,732 A | * | 4/1998 | Cherukuri et al. .......... 711/168 |
| 5,758,183 A | | 5/1998 | Scales ......................... 395/825 |
| 5,761,729 A | | 6/1998 | Scales ......................... 711/148 |
| 5,787,480 A | | 7/1998 | Scales et al. ................ 711/148 |
| 5,802,585 A | | 9/1998 | Scales et al. ................ 711/154 |
| 5,809,450 A | | 9/1998 | Chrysos et al. ............. 702/186 |
| 5,875,151 A | | 2/1999 | Mick ........................... 365/233 |
| 5,890,201 A | | 3/1999 | McLellan et al. ........... 711/108 |
| 5,893,931 A | | 4/1999 | Peng et al. .................. 711/206 |
| 5,915,104 A | * | 6/1999 | Miller ......................... 710/310 |
| 5,918,250 A | | 6/1999 | Hammond .................. 711/205 |
| 5,918,251 A | | 6/1999 | Yamada et al. ............. 711/207 |
| 5,923,872 A | | 7/1999 | Chrysos et al. ............. 395/591 |
| 5,950,228 A | | 9/1999 | Scales et al. ................ 711/148 |
| 5,964,867 A | | 10/1999 | Anderson et al. ........... 712/219 |
| 5,983,325 A | | 11/1999 | Lewchuk ..................... 711/137 |
| 6,000,044 A | | 12/1999 | Chrysos et al. ............... 714/47 |
| 6,033,441 A | * | 3/2000 | Herbert ....................... 709/400 |
| 6,070,227 A | | 5/2000 | Rokicki ....................... 711/117 |
| 6,085,300 A | | 7/2000 | Sunaga et al. ............... 711/168 |
| 6,134,638 A | * | 10/2000 | Olarig et al. ................ 711/167 |
| 6,636,955 B1 | * | 10/2003 | Kessler et al. ............... 711/167 |

OTHER PUBLICATIONS

*Testability Features of AMD–K6™ Microprocessor*, R. S. Fetherston et al., Advanced Micro Devices (8 p.).

*Hardware Fault Containment In Scalable Shared–Memory Multiprocessors*, D. Teodosiu et al., Computer Systems Laboratory, Stanford University (12 p.), 1977.

*Cellular Disco: resource management using virtual clusters on shared–memory multiprocessors*, K. Govil et al., 1999 ACM 1–58113–140–2/99/0012 (16 p.).

*Are Your PLDs Metastable?*, Cypress Semiconductor Corporation, Mar. 6, 1997 (19 p.).

*Rambus® RIMM™ Module (with 128/144Mb RDRAMs)*, Preliminary Information, Document DL0084 Version 1.1 (12 p.).

*Direct Rambus™ RIMM™ Module Specification Version 1.0*, Rambus Inc., SL–0006–100 (32 p.), 2000.

*End–To–End Fault Containment In Scalable Shared–Memory Multiprocessors*, D. Teodosiu, Jul. 2000 (148 p.).

* cited by examiner

MECHANISM FOR SYNCHRONIZING MULTIPLE SKEWED SOURCE-SYNCHRONOUS DATA CHANNELS WITH AUTOMATIC INITIALIZATION FEATURE

CROSS-REFERENCE TO RELATED APPLICATIONS

This application is a divisional of application Ser. No. 09/652,480 filed on Aug. 31, 2000, entitled, "Mechanism For Synchronizing Multiple Skewed Source-Synchronous Data Channels With Automatic Initialization Feature," now U.S. Pat. No. 6,636,955 (incorporated herein by reference as if reproduced in full below), and this application further relates to the following commonly assigned co-pending applications entitled:

This application relates to the following commonly assigned co-pending applications entitled:

"Apparatus And Method For Interfacing A High Speed Scan-Path With Slow-Speed Test Equipment," Ser. No. 09/653,642, filed Aug. 31, 2000, "Priority Rules For Reducing Network Message Routing Latency" Ser. No. 09/652,322, filed Aug. 31, 2000, "Scalable Directory Based Cache Coherence Protocol" Ser. No. 09/652,703, filed Aug. 31, 2000, "Scalable Efficient I/O Port Protocol," Ser. No. 09/652,391, filed Aug. 31, 2000, "Efficient Translation Lookaside Buffer Miss Processing In Computer Systems With A Large Range Of Page Sizes," Ser. No. 09/652,552, filed Aug. 31, 2000, "Fault Containment And Error Recovery Techniques In A Scalable Multiprocessor" Ser. No. 09/651,949, filed Aug. 31, 2000, "Speculative Directory Writes In A Directory Based Cache Coherent Nonuniform Memory Access Protocol," Ser. No. 09/652,834, filed Aug. 31, 2000, "Special Encoding Of Known Bad Data," Ser. No. 09/652,314, filed Aug. 31, 2000, "Broadcast Invalidate Scheme," Ser. No. 09/652,165, filed Aug. 31, 2000; "Mechanism To Track All Open Pages In A DRAM Memory System," Ser. No. 09/652,704, filed Aug. 31, 2000, "Programmable DRAM Address Mapping Mechanism," Ser. No. 09/653,093, filed Aug. 31, 2000; "Computer Architecture And System For Efficient Management Of Bi-Directional Bus," Ser. No. 09/652,323, filed Aug. 31, 2000, "An Efficient Address Interleaving With Simultaneous Multiple Locality Options," Ser. No. 09/652,452, filed Aug. 31, 2000; "A High Performance Way Allocation Strategy For A Multi-Way Associative Cache System," Ser. No. 09/653,092, filed Aug. 31, 2000; "Method And System For Absorbing Defects In High Performance Microprocessor With A Large N-Way Set Associative Cache," Ser. No. 09/651,948, filed Aug. 31, 2000; "A Method For Reducing Directory Writes And Latency In A High Performance, Directory-Based, Coherency Protocol," Ser. No. 09/652,324, filed Aug. 31, 2000; "Mechanism To Reorder Memory Read And Write Transactions For Reduced Latency And Increased Bandwidth," Ser. No. 09/653,094, filed Aug. 31, 2000; "System For Minimizing Memory Bank Conflicts In A Computer System," Ser. No. 09/652,325, filed Aug. 31, 2000; "Computer Resource Management And Allocation System," Ser. No. 09/651,945, filed Aug. 31, 2000; "Input Data Recovery Scheme," Ser. No. 09/653,643, filed Aug. 31, 2000; "Fast Lane Prefetching," Ser. No. 09/652.451, filed Aug. 31, 2000; "Mechanism To Control The Allocation Of An N-Source Shared Buffer," Ser. No. 09/651.924, filed Aug. 31, 2000; and "Chaining Directory Reads And Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to a mechanism that reduces skew in data and clock signal timing between related source-synchronous data channels. More particularly, the invention relates to a memory controller that reduces skew between related skewed data channels. More particularly still, the invention relates to reducing skew between data channels and providing an automatic feature to initialize the logic used to reduce the skew.

2. Background of the Invention

Digital electronic systems, such as all types of computers, cellular telephones, DVD players, etc., have various technical issues that must be addressed when designing such systems. This disclosure focuses on one such issue—how to transmit digital data between two points within the system.

Digital signals are electrical signals whose voltage level at any point in time is either at one predetermined level or another (e.g., 3.3V and 0V). Information is encoded into a digital signal by way of the voltage levels and/or the sharp transitions (referred to as "edges") between the voltage levels. Digital signals typically are synchronized to a clock signal. A clock signal is a periodic digital signal which repeatedly oscillates between two voltage levels. When transmitting digital data from a source point to a receiving point within a digital system, both the source device and the receiving device must use a clock signal to send and receive the data. Each clock signal is generated with some type of clock generating circuit, such as a crystal oscillator. Further, the source device and receiving device may generate their own clocks independently of each other. As such, although both devices may generate and use, for example, a 100 Megahertz ("MHz") clock (i.e., 100 million cycles per second), the two clocks may not be synchronized. This means that the rising and falling edges of the two clocks do not coincide with respect to time.

Generally, there are two types of clocking schemes available to send data between devices in a digital system—receiver-synchronous clocking and source-synchronous clocking. In receiver-synchronous clocking, the source device uses its clock to transmit the data and the receiving device uses the receivers clock to receive the data. That is, both devices use their own, unsynchronized clocks. The advantage of receiver-synchronous clocking is that a clock signal does not need to be transmitted along with the data, thereby saving a wire or signal trace on a printed circuit board. Additionally, once the transmitted data is clocked into an input buffer in the receiving device, the data is already in the clock "domain" of the receiving device (i.e., the data is synchronized to the clock of the receiving device). A disadvantage of receiver-synchronous clocking is that the circuitry needed to receive the transmitted data into an input buffer in the receiving device is relatively complex because the transmitted data is not already synchronized with the receivers clock.

Figure 1:
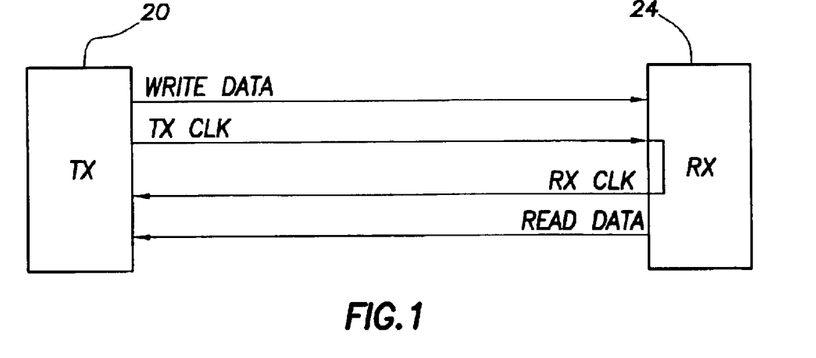
FIG. 1 conceptually shows a transmitter and receiver using source-synchronous clocking.

Source-synchronous clocking requires the source device to transmit its clock along with the data to the receiving device. The receiving device then uses the source's clock to latch in the transmitted data into the receiver's input buffer and uses the same clock signal to provide data back to the source. FIG. 1 conceptually illustrates source-synchronous clocking. As shown, a transmitter ("TX") 20 provides data (designated as "write data") to the receiver ("RX") 24. Along with the write data, the transmitter 20 sends its clock ("TX CLK") to the receiver 24, which the receiver uses to latch in the write data. The TX CLK is routed back to the transmitter conceptually as shown. When the receiver 24 needs to provide data back to the transmitter ("read data"), the receiver 24 uses the RX CLK, which originally was generated by the transmitter 20, to place the read data on the bus back to the transmitter 20.

Source-synchronous clocking enables the receiver to have a relatively simple input circuit to clock in the transmitted data, but disadvantageously requires an extra wire for the source's clock and, following receipt by the receiver, also requires the transmitted data to be synchronized by the receiver to the receiver's clock.

Figure 2:
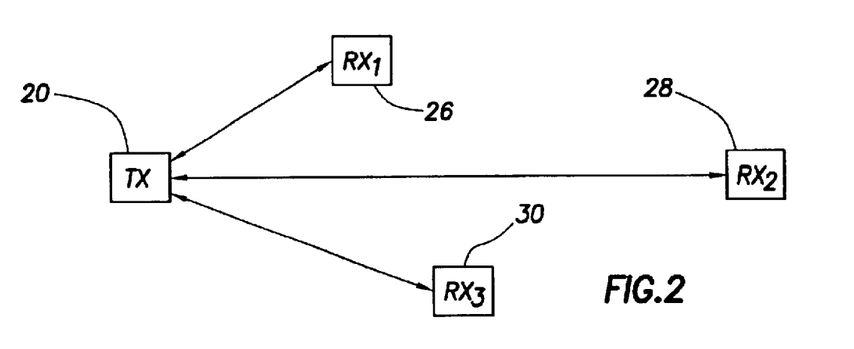
FIG. 2 illustrates skewing cause by receiving devices located different distances from a transmitter.

The present disclosure addresses issues that arise in a source-synchronous transmission scheme in a digital system. For example, referring to FIG. 2, a transmitter 20 may communicate data to three different receivers 26, 28, and 30. As shown, each of the three receivers may be physically located a different distance from the transmitter. Because signals take a finite amount of time to propagate along a conductor, the RX CLK signals each receiver routes back to the transmitter may not be synchronized. That is, the TX CLK signals provided to each receiver are synchronized when they leave the transmitter 20, but by the time those signals each follow their round trip path to and from their respective receiver, the signals are out of phase with respect to each other by the time they are received back at the transmitter 20. This phase difference is referred to generally as "skew" and is a problem that must be addressed to synchronize data received from the three receivers. The problem of skewing has become increasingly a more significant problem as data rates have increased.

Some digital transmission systems use a "valid" signal that is transmitted along with data to a receiving device. The valid signal alerts the receiving device that valid data is present on the bus and should be latched in to the receiving device. Although a generally effective scheme, the valid signal requires a separate wire dedicated to the valid signal. A system may have many such valid signals. Valid signals thus disadvantageously occupy valuable real estate on a printed circuit board that might be better used for other functionality.

Accordingly, there is a need to solve reduce or eliminate skew in multi-channel digital communication system. Further, such a solution should also be relatively easy to initialize and avoid, if possible, using a valid signal. Despite the advantages such a system would provide, to date no such system is known to exist.

BRIEF SUMMARY OF THE INVENTION

The problems noted above are solved in large part by a computer system having a memory controller that includes read buffers coupled to a plurality of memory channels. The memory controller advantageously eliminates the interchannel skew caused by memory modules being located at different distances from the memory controller. The memory controller preferably includes a channel interface and synchronization logic circuit for each memory channel. This circuit includes read and write buffers and load and unload pointers for the read buffer. Unload pointer logic generates the unload pointer and load pointer logic generates the load pointer. The pointers preferably are free-running pointers that increment in accordance with two different clock signals. The load pointer increments in accordance with a clock generated by the memory controller but that has been routed out to and back from the memory modules. The unload pointer increments in accordance with a clock generated by the computer system itself.

Because the trace length of each memory channel may differ, the time that it takes for a memory module to provide read data back to the memory controller may differ for each channel. The "skew" is defined as the difference in time between when the data arrives on the earliest channel and when data arrives on the latest channel. The skew is determined a priori and programmed into the system.

During system initialization, the pointers are synchronized. A predetermined bit pattern (e.g., all 1s) is written to each of the memory channels and then read back approximately simultaneously from the channels. Each channel's load pointer is held at 0 until the predetermined bit pattern is received on that particular channel. When the bit pattern is detected on a channel, that channel's read pointer is released and permitted to continue incrementing. After the system issues the read command to the memory modules, the system counts an amount of time approximately equal to the predetermined skew. At the end of that time, the memory controller should have at least begun receiving the requested bit pattern from the latest memory channel. At that time, each of the unload pointers are released and allowed to increment. At this point, the pointers are initialized. Consequently, using these pointers to load and unload the read buffers causes the effects of the skew to be eliminated. This and other benefits will become apparent upon reviewing the following description.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The preferred embodiment of the invention described herein addresses the problems noted above with respect to a memory controller. A memory controller was chosen merely to illustrate an embodiment of the invention, and should not be used to limit the scope of the patent. It should be noted that the concepts and techniques can readily be extended to any type of digital system that experiences the problems noted above. Unless otherwise stated in the claims, the claims should not be limited to the specific embodiment described below.

Figure 3:
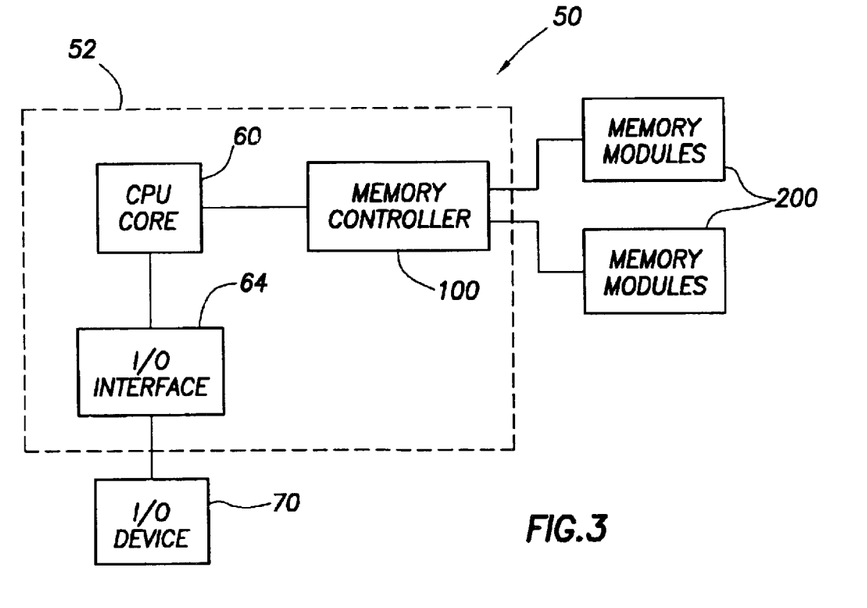
FIG. 3 shows a computer system in accordance with the preferred embodiment.

Referring to FIG. 3, a computer system 50 is shown as including a processor 52 which includes a CPU core 60, an input/output ("I/O") interface 64, and a memory controller 100. The computer system 50 also includes at least one I/O device 70 coupled the I/O controller 64 and one or more memory modules 200 coupled to the memory controller 100. One of ordinary skill in the art will appreciate that computer systems typically have many other components which have been omitted from FIG. 3 for sake of clarity. The I/O device 70 can be a keyboard, mouse, display, storage device or any other desired type of I/O device. Multiple I/O device can be coupled to the processor 52 if desired. Further, the computer system 50 may include two or more memory controllers if desired. An exemplary processor is shown and described in one or more of the co-pending applications that were incorporated by reference at the beginning of this disclosure.

Figure 4:
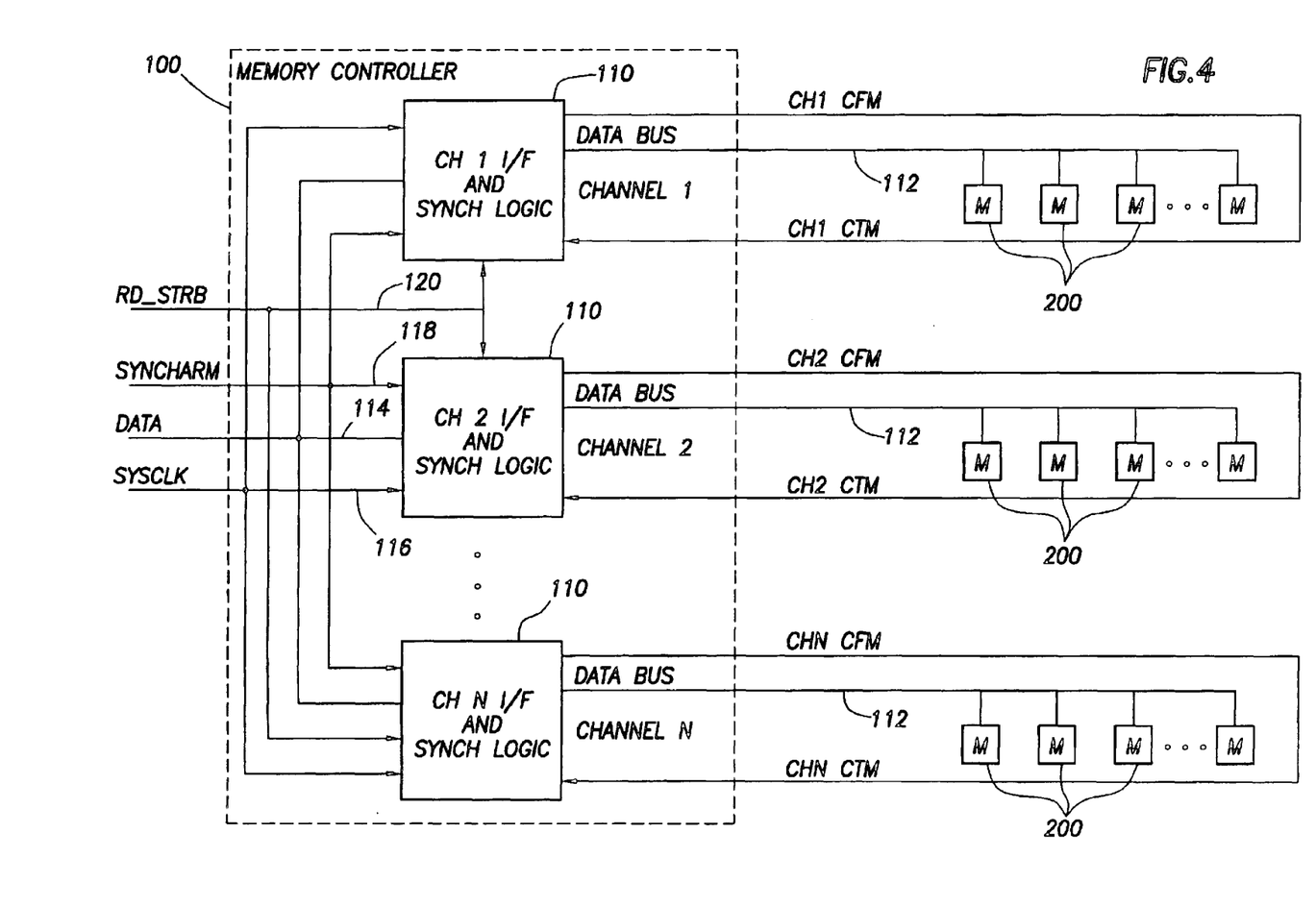
FIG. 4 shows a preferred embodiment of the invention to include a plurality of memory devices and a memory controller that includes synchronous logic to reduce or eliminate skew.

Referring to FIG. 4, a memory controller constructed in accordance with a preferred embodiment of the invention couples to a plurality of memory modules ("M") 200 as shown. As shown, the memory controller 100 includes a plurality of memory module channels (channel 1, channel 2, ... channel N). Each channel includes a channel interface and synchronization ("synch") logic circuit 110 coupled to one or more memory modules 200. The memory modules preferably include RAMBUS® memory devices. Other types of memory devices are also acceptable.

Referring still to FIG. 4, each set of memory modules 200 couples to its associated channel interface and synch logic 110 via a data bus 112. The data bus preferably is a bi-directional bus that permits the memory controller 100 to perform both read and write cycles (also referred to as load and store operations) to memory. Preferably, a separate control bus or collection of control signals (not shown) is included in addition to the data bus to provide control signals to the memory modules 200.

In accordance with the preferred embodiment of the invention, the memory controller 100 uses source-synchronous logic to transfer data on the data busses 112. As such, each channel interface and synch logic 110 provides an internally generated clock labeled as CHx CFM ("clock from master") to the memory modules 200. Each set of memory modules 200 uses its associated CFM clock to latch in data from the bus 112 during a write operation. As shown, each CFM clock is routed back to the channel interface and synch logic 110 from which it came. The return path clock is labeled as CHx CTM ("clock to master"). Preferably, the memory modules synchronize their read data to the CTM clock when providing data back to the memory controller 100 in response to a read request.

The memory controller 100 and memory modules 200 are shown in block diagram form, not physical layout, in FIG. 4. It should be recognized that each group of memory modules 200 physically may be located a different distance from its associated channel interface and synch logic 110. As such, skew may, and likely will, be present with respect to the various CTM clock signals. Each channel interface and synch logic 110 reduces or eliminates the effects of the skew present on the CTM signals.

Although not all of the input and output signals to and from the memory controller 100 are shown, those signals particularly relevant to solving the skew problem are shown in FIG. 4. A data bus 114 is used to provide data from the rest of the system to be written to the memory modules 200 through the memory controller 100. The data bus 114 is also used to provide data that has been read from the memory modules 200 to the rest of the system 50. The system clock ("SYS CLK") signal 116 is a clock signal generated by the system in which the memory controller 100 resides. The synchronization arm ("SYNCH ARM") and Read Strobe ("RD_STRB") signals 118 and 120 are used by each channel interface and synch logic 110 to initialize their pointers which are described below with respect to FIGS. 5 and 6. Each of the data bus 114, SYS CLK 116, SYNCH ARM 118, and RD_STRB 120 signals are coupled to each channel interface and synch logic 110 preferably as shown.

In general, each channel interface and synch logic circuit 110 effectively removes the skew that may be present between the various memory module channels. The skew that is removed by the synch logic circuits 110 is the time delay associated with a read command between the fastest channel and the slowest channel. In other words, referring to FIG. 4, if the memory controller 100 was to issue a read command simultaneously to each of the memory channels and wait for the requested data to be provided from the channels at all the memory controller's interface and synch logics 110, data from the closest set of memory modules will arrive first and data from the farthest set of memory modules will arrive last. The difference in these two times is the "skew."

Figure 5:
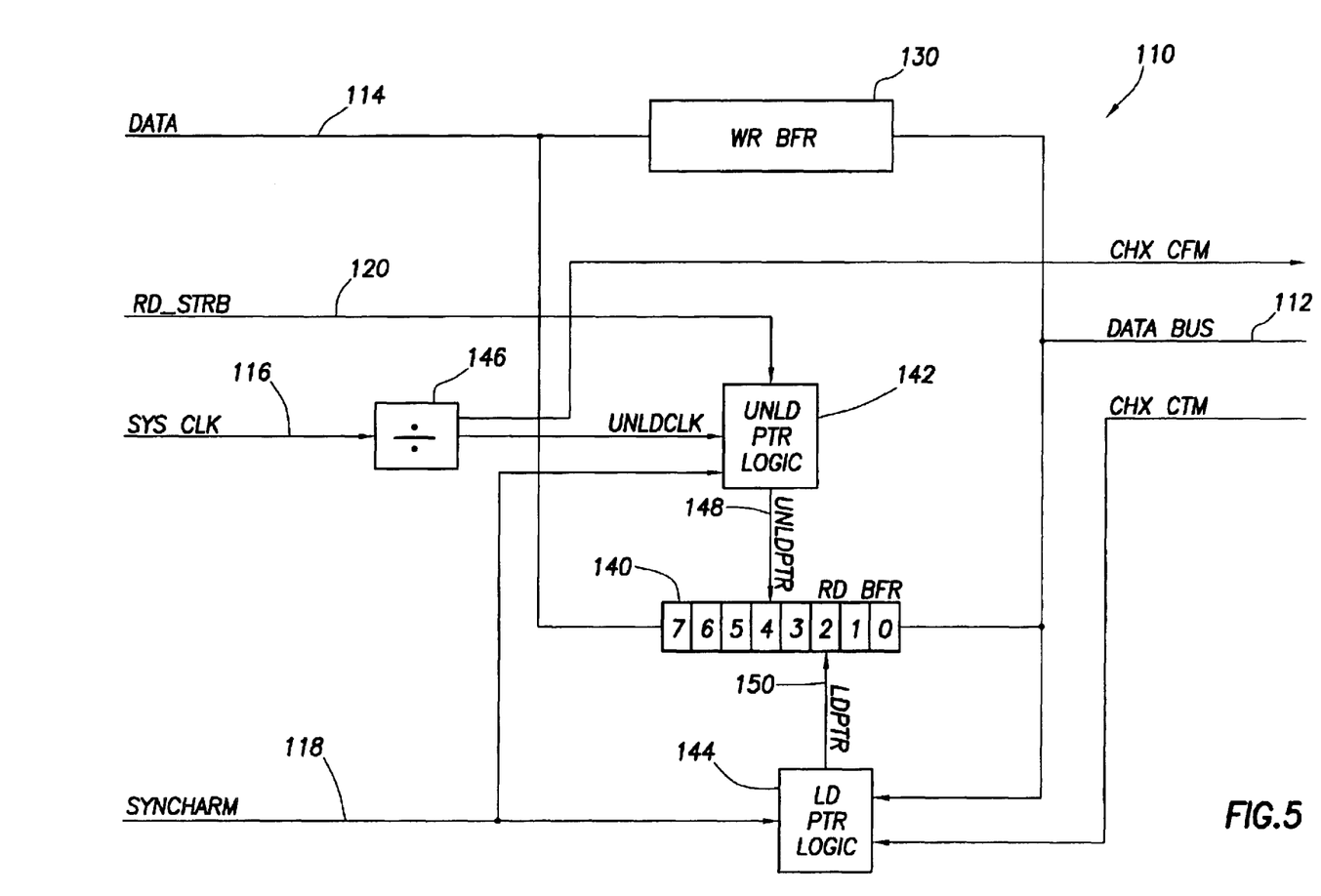
FIG. 5 shows a detailed schematic of the synchronous logic of FIG. 4.

FIG. 5 shows a channel interface and synch logic circuit 110. As shown, the logic circuit 110 preferably includes a write buffer ("WR BFR") 130, a read buffer ("RD BFR") 140, an unload pointer logic ("UNLD PTR LOGIC") 142, a load pointer logic ("LD PTR LOGIC") 144, and a clock divider 146. Other components may be included as well but have not been shown for sake of clarity.

Data to be written to the memory modules 200 is temporarily stored in the WR BFR 130 and at the appropriate time transferred to the memory modules over data bus 112. Data provided by the memory modules 200 in response to a read command is temporarily stored in RD BFR 140 and subsequently transferred via data bus 114 to the device (not shown) in the system that requested the data. The WR BFR 130 preferably is designed to have capacity for any desired number of bytes of write data. The RD BFR 140 preferably is larger than the maximum skew (e.g., an 8-entry buffer), although a different number of entries is also acceptable.

The LD PTR LOGIC 144 generates a LD PTR 150 that points to the next entry in the read buffer into which read data sent by a memory module 200 is to be stored. The LD PTR LOGIC 140 increments the LD PTR 150 for each subsequent unit of data. The LD PTR LOGIC 150 uses the CHx CTM clock from the memory modules 200 to increment the LD PTR 150. The SYNCH ARM signal 118 also is provided as an input signal to the LD PTR LOGIC 144.

The UNLD PTR LOGIC 140 generates an UNLDR PTR pointer 148 that points to the entry in the RD BFR 140 from which data is to be extracted and provided on data bus 114 to the device that issued the read command. Several input signals are provided to the UNLD PTR LOGIC 142, namely the SYNCH ARM signal 118, the RD_STRB signal 120 and an UNLD CLK signal from clock divider 146. Clock divider 146 can be included if desired to divide down the SYS CLK 116 to a suitable frequency for use in operating taking data out of the RD BFR 140. The clock divider 146 naturally will be specific to the particular application at hand. For example, if the SYS CLK 116 signal has a frequency of 1 GHz and the UNLD PTR LOGIC 142 requires a 100 MHz clock, the clock divider 146 may be a "divide by 10" clock to generate an UNLD CLK that is 10 times slower than the SYS CLK 116. The clock divider 146 preferably generates both the UNLD CLK for the UNLD PTR LOGIC 142 and the CHx CFM clock for the memory modules 200. The frequency of the CHx CFM clock may or may not be the same as the frequency of the UNLD CLK signal.

The use of the channel interface and synch logic 110 to de-skew the various memory module channels will now be described. In some suitable manner, the skew associated with the slowest channel (i.e., farthest channel in terms of trace distance from the memory controller 100) should be determined. For example, the skew can be calculated given the trace lengths or measured with appropriate test equipment on a given system or in some other suitable manner. Once determined, and assuming all circuit boards are fabricated substantially the same, the skew should thus be known for all such computer systems. In general, the system corrects for this skew between channels by waiting to retrieve data from any of the RD BFRs 140 until the RD BFR 140 associated with the slowest channel begins receiving its data from its associated memory modules 200. In other words, the system waits until all of the channels begin receiving data and before beginning consuming data from the read buffers. This process will be described in more detail below.

Figure 6:
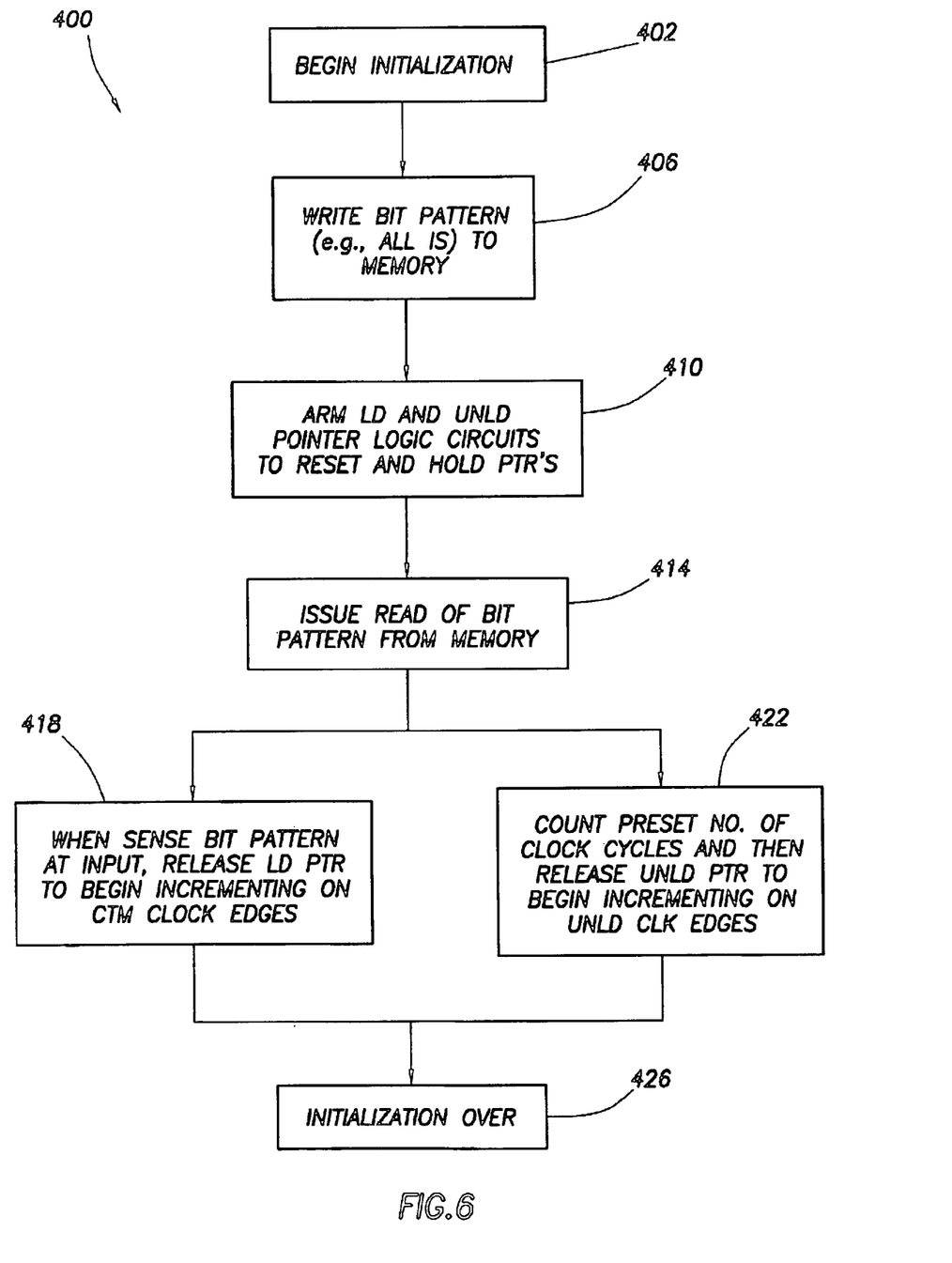
FIG. 6 shows the preferred process to initialize pointers used by the synchronous logic of FIG. 5.

Before the memory system is used to eliminate the skew, it should be initialized. Referring now to FIGS. 5 and 6, a preferred initialization process 400 is shown (FIG. 6). In step 402, the initialization process begins. Initialization preferably begins automatically during system boot up, but can also be started as desired during normal operation. In step 406, the memory controller 100 writes predetermined bit pattern to each of the memory modules 200. The predetermined bit pattern can be any string of bits the beginning of which is easily distinguishable given the operation of the bus when no data is being transmitted. Because RAMbus® memory is used in the preferred embodiment and logic 0 levels are present on the bus during idle periods, the predetermined bit pattern preferably begins with a logic 1 and may be all 1s if desired. In step 410, the SYNCH ARM signal 118 is asserted (by logic not shown in the Figures in response to a request by a CPU, for example). The SYNCH ARM signal 118 directs or causes the UNLD PTR LOGIC 142 and LD PTR LOGIC 144 to hold their pointers 148, 150, respectively, at preferably 0, thereby preventing the pointers from incrementing as would be the case in normal operation. Alternatively, the pointers may be held at non-zero values as desired, and not necessarily even at the same value. Thus, both pointers are maintained pointing to location 0 in RD BFR 140.

In step 414, the memory controller 100 issues a read command substantially simultaneously to each of the sets of memory modules 200. In step 418, each channel interface and synch logic 110 waits for the requested bit pattern from the associated memory modules 200. With reference to FIG. 5, the LD PTR LOGIC 144 in each channel interface and synch logic 110 detects the presence of the requested bit pattern from the memory modules 200. As shown the data bus 112 couples to the LD PTR LOGIC 144 which monitors the bus for the bit pattern. During initialization, no traffic should be present on data bus 112 and thus the bits comprising the bus will be held at logic 0. If the bit pattern is all 1s (or at least begins with a logic 1), the LD PTR LOGIC 144 senses the presence of a 1 and, on that event, determines that the bit pattern retrieved from the memory modules 200 have arrived. At that point, the LD PTR LOGIC 144 releases the LD PTR 150 to increment with each successive clock cycle or edge of the associated CTM clock, thereby initializing the LD PTR 150.

In step 422, the UNLD PTR 148 is initialized. The system in which the memory controller 100 resides issues the read request in step 414. Preferably, the skew explained above has been predetermined, calculated, or measured. After the system issues the read command, the system counts an amount of time approximately equal to the skew. At the expiration of that time, the system asserts the RD_STRB signal 120 to all of the channel interface and synch logics 110. The RD_STRB signal 120 directs each UNLD PTR LOGIC 142 to release its UNLD PTR 148 to increment with each successive cycle or edge of the UNLD CLK signal. Because the RD_STRB signal 120 is asserted to each channel interface and synch logic 110 at approximately the same time, each of the UNLD PTR signals 148 will be released to increment at approximately the same time, and thus be synchronized with each other. By synchronizing all of the UNLD PTR signals, all of the channel interface and synch logic circuits 110 will retrieve data from their RD BFRs 140 in unison.

Finally, the initialization process 400 completes in step 426. At that point all of the LD PTR signals 150 are permitted to continue incrementing with the CTM clocks. The LD PTR signals are free running pointers that continuously increment using the CTM clocks and, upon reaching entry 7 in the exemplary buffer of FIG. 5, wrap around to 0 and continue incrementing. The initialization process synchronizes all of the LD PTRs 148 so that each corresponding block of read data received across the data busses 112 will be written to the same entry in each of the RD BFRs 140. The preferred initialization process described above also synchronizes the UNLD PTRs 148 so that the read data stored in each of the RD BFRs 140 can be accessed by the system correctly. The normal operation of the system to eliminate inter-channel skew once the pointers are initialized will now be described.

In normal operation, the system may, for example, desire to read data from each memory module. The requested data from each channel may be a portion of a larger set of data and thus, the system may need to read a data block from each of the channels concurrently. To that end, the system will issue a read command through the memory controller 100 to read a first block of data from each channel simultaneously. The requested data from each channel will be received over the data bus 112 to the respective read buffers in the channel interface and synch logics 110. The system will consume the data from the RD BFRs 140. Because of the skew problem, however, the system may consume data from one channel's RD BFR 140 before the corresponding data from another, more distant, channel has been written to its RD BFR. The preferred embodiment of the present invention solves this problem.

Because the LD PTRs 150 have all been synchronized to each other, each block of read data provided over the data busses 112 will be written to the same entry in each RD BFR 140. That is, a first data block on each channel will be written, for example, to entry number 0 in each RD BFR 140, although the first data block may not arrive at each channel interface and synch logic 110 at precisely the same time because of the skew. As such, the read data is loaded into the RD BFR in a synchronized fashion so that each entry in the buffers contain data corresponding to associated data in each entry in the other channels.

The system, after issuing the read command to the channels, preferably counts an amount of time approximately equal to the predetermined skew value. At the end of that time, the system is assured that data from the farthest (i.e., slowest) channel has made its way to its associated RD BFR 140. At that point, it is safe for the system to begin consuming data from all of the RD BFRs 140.

The preferred embodiment of the invention described herein provides one or more of the following benefits. First, the effects of any inter-channel skew is eliminated. Second, the preferred embodiment avoids having to use valid signals to signify the beginning of a data stream. Also, initialization is performed automatically which greatly simplifies the implementation as compared to prior art systems. Once synchronized, synchrony is maintained even though the load and unload pointers are free running. Finally, the preferred embodiment permits the load and unload pointers to be reinitialized under software control in the event of a hardware fault condition. The aforementioned benefits should in no way limit the claims which follow.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A memory controller, comprising:
    a plurality of multi-entry read buffers each coupled to a memory module, data from said memory modules being stored in said read buffers in response to a read command;
    a plurality of load pointer logic circuits each generating a load pointer that identifies an entry in an associated read buffer in which data is to be loaded;
    a plurality of unload pointer logic circuits each generating an unload pointer that identifies an entry in an associated read buffer from which data is to be consumed;
    each of said load pointer logic circuits and said unload pointer logic circuits receiving a synch arm signal which causes said logic circuits to hold their associated pointers at a predetermined pointer value to initialize the pointers; and
    wherein during initialization all of said unload pointer logic circuits receive a read strobe signal that causes the unload pointer logic circuits to release their unload pointers to begin incrementing, and a clock signal to increment the unload pointers.

2. The memory controller at claim 1 each unload pointer logic circuit increments its unload pointer using a clock signal provided from a dock divider coupled to the unload pointer logic circuit.

3. The memory controller of claim 1 wherein all of said load pointer logic circuits couple to a data bus which couples to at least some of the memory modules and during initialization when each of said load pointer logic circuits detects the presence of a bit pattern on its associated data bus causes its load pointer to be released and begin incrementing.

4. The memory controller of claim 1 wherein, after initialization completes, said load and unload pointers are free running pointers.

5. The memory controller of claim 1 wherein, after initialization, said load pointer logic circuits increment their load pointers using source synchronous clocking.

6. The memory controller of claim 5 wherein, after initialization, said unload pointer logic circuits increment their unload pointers using a clock that is not guaranteed to be substantially in phase with clocks used by the load pointer logic circuits to increment the load pointers.

7. A computer system, comprising:
    a CPU core;
    an I/O device coupled to said CPU core; and
    a memory controller coupled to a plurality of memory modules, comprising
        a plurality of multi-entry read buffers each coupled to a memory module, data from said memory modules being stored in said read buffers in response to a read command;
        a plurality of load pointer logic circuits each generating a load pointer that identifies an entry in an associated read buffer in which data is to be loaded;
        a plurality of unload pointer logic circuits each generating an unload pointer that identifies an entry in an associated read buffer from which data is to be consumed; and
    each of said load pointer logic circuits and said unload pointer logic circuits receiving a synch arm signal which causes said logic circuits to hold their associated pointers at a predetermined pointer value to initialize the pointers;
        wherein during initialization all of said unload pointer logic circuits receive a read strobe signal that causes the unload pointer logic circuits to release their unload pointers to begin incrementing, and a clock signal to increment the unload pointers.

8. The computer system of claim 7 each unload pointer logic circuit increments its unload pointer using a dock signal provided from a clock divider coupled to the unload pointer logic circuit.

9. The computer system of claim 7 wherein all of said load pointer logic circuits couple to a data bus which couples to at least some of the memory modules and during initialization when each of said load pointer logic circuits detects the presence of a bit pattern on its associated data bus causes its load pointer to be released and begin incrementing.

10. The computer system of claim 7 wherein, after initialization completes, said load and unload pointers are free running pointers.

11. The computer system of claim 7 wherein, after initialization, said load pointer logic circuits increment their load pointers using source synchronous clocking.

12. The computer system of claim 11 wherein, after initialization, said unload pointer logic circuits increment their unload painters using a clock that is not guaranteed to be substantially in phase with clocks used by the load pointer logic circuits to increment the load pointers.

* * * * *

UNITED STATES PATENT AND TRADEMARK OFFICE
CERTIFICATE OF CORRECTION

| | |
|---|---|
| PATENT NO. | : 7,024,533 B2 |
| APPLICATION NO. | : 10/441451 |
| DATED | : April 4, 2006 |
| INVENTOR(S) | : Richard E. Kessler et al. |

It is certified that error appears in the above-identified patent and that said Letters Patent is hereby corrected as shown below:

On the Title page, in field (62), under "Related U.S. Application Data", in column 1, line 1, delete "Aug. 13," and insert -- Aug. 31, --, therefor.

In column 9, line 58, in Claim 2, delete "at" and insert -- of --, therefor.

In column 10, line 43, in Claim 8, delete "dock" and insert -- clock --, therefor.

In column 10, line 60, in Claim 12, delete "painters" and insert -- pointers --, therefor.

Signed and Sealed this

Twenty-first Day of July, 2009

JOHN DOLL
*Acting Director of the United States Patent and Trademark Office*